(12) United States Patent
Öttinger et al.

(10) Patent No.: US 6,258,457 B1
(45) Date of Patent: Jul. 10, 2001

(54) METAL-REINFORCED GRAPHITE MULTILAYER SHEET

(75) Inventors: Oswin Öttinger; Silvia Mechen, both of Meitingen (DE); Mike Römmler, Los Angeles, CA (US)

(73) Assignee: SGL Technik GmbH, Meitingen (DE)

( * ) Notice: Subject to any disclaimer, the term of this patent is extended or adjusted under 35 U.S.C. 154(b) by 0 days.

(21) Appl. No.: 09/244,836

(22) Filed: Feb. 4, 1999

(30) Foreign Application Priority Data

Feb. 4, 1998 (DE) .............................. 198 04 283

(51) Int. Cl.⁷ .................................................. B32B 9/00
(52) U.S. Cl. ..................... 428/408; 428/216; 428/218; 428/408; 277/938; 277/936; 277/944; 277/946
(58) Field of Search .................................. 428/216, 218, 428/408; 277/938, 936, 944, 946

(56) References Cited

U.S. PATENT DOCUMENTS

| 4,234,638 | 11/1980 | Yamazoe et al. . |
| 4,676,515 | 6/1987 | Cobb . |
| 5,100,737 | 3/1992 | Colombier et al. . |
| 5,128,209 | * 7/1992 | Sakai et al. ..................... 428/421 |
| 5,509,993 | 4/1996 | Hirschvogel . |

FOREIGN PATENT DOCUMENTS

| 33 09 338 A1 | 9/1984 | (DE) . |
| 37 19 484 A1 | 12/1988 | (DE) . |
| 37 32 360 C2 | 4/1989 | (DE) . |
| 41 22 242 C2 | 10/1992 | (DE) . |
| 43 09 700 A1 | 9/1994 | (DE) . |
| 0 263 402 | 4/1988 | (EP) . |
| 0 352 608 A2 | 1/1990 | (EP) . |
| 0 640 782 A1 | 3/1995 | (EP) . |
| 1166370 | 10/1969 | (GB) . |
| 2 182 985 | 5/1987 | (GB) . |
| 2 227 059 | 7/1990 | (GB) . |
| 02253939 | 10/1990 | (JP) . |

OTHER PUBLICATIONS

Patent Abstracts of Japan No. 07–027231 A (Takahito et al.), dated Jan. 27, 1995.

* cited by examiner

Primary Examiner—Deborah Jones
Assistant Examiner—Lymarie Miranda
(74) Attorney, Agent, or Firm—Herbert L. Lerner; Laurence A. Greenberg; Werner H. Stemer

(57) ABSTRACT

A multilayer sheet having high compressive strength, high heat resistance and low permeability relative to fluids, includes layers of graphite foils and metal foils disposed alternating one upon another and parallel, with the graphite foils joined to the metal foils. Each of two layers forming an upper and a lower boundary of the multilayer sheet is a metal foil having a flat outwardly-directed surface completely covered with and joined to a gas-tight foil made of an organic polymer having a long-term temperature stability of at least 150° C. Preferably, no adhesives are used for joining the foils. The multilayer sheet is preferably used for producing flat gaskets.

67 Claims, 3 Drawing Sheets

METAL-REINFORCED GRAPHITE MULTILAYER SHEET

BACKGROUND OF THE INVENTION

Field of the Invention

The invention relates to a multilayer sheet having high compressive strength, high heat resistance and low permeability relative to fluids, including layers of graphite foils and metal foils alternatingly disposed one upon another and parallel, with the graphite foils joined to the metal foils.

Such multilayer sheets are used, in particular, in sealing technology and for impermeable linings. U.S. Pat. No. 5,128,209 describes a gasket material being formed of layers of a fluoropolymer, graphite foils and metal foils, with the layers being bonded together by an adhesive. The layers of the fluoropolymer are made of material which is porous and therefore permeable to fluids. They impart a greater stability, toughness, tensile strength and an improved handling to that component of the composite being formed of the graphite foils and the fluoropolymer foils. The disadvantages of that gasket material are firstly the permeability of the fluoropolymer foils to fluids and the presence of adhesives as bonding agents between the layers. The fluoropolymer foils contribute virtually nothing to the impermeability of the overall system, which has an adverse effect especially in the case of gaskets for high and extreme impermeability requirements. The adhesives are a weak point, especially in the case of gaskets subjected to high pressures or stresses, because the layers of the multilayer sheet can slide on them. That ultimately leads to the non-operability of the gasket or, in particular in co-operation with elevated temperatures, to fine cracks occurring in the adhesive layer which impair the sealing effect.

SUMMARY OF THE INVENTION

It is accordingly an object of the invention to provide a metal-reinforced graphite multilayer sheet, which overcomes the hereinafore-mentioned disadvantages of the heretofore-known products of this general type, which is to be used for sealing purposes and which has an improved impermeability and an improved compressive strength with a long-term temperature stability of at least 150° C.

With the foregoing and other objects in view there is provided, in accordance with the invention, a multilayer sheet having high compressive strength, high heat resistance and low permeability relative to fluids, comprising alternating parallel layers of at least one graphite foil and metal foils disposed one upon the other and joined to one another; the layers of metal foils including an upper boundary layer and a lower boundary layer each having a flat outwardly-directed surface; and two gas-tight foils made of an organic polymer having a long-term temperature stability of at least 150° C., the gas-tight foils each completely covering and joined to a respective one of the flat outwardly-directed surfaces of the metal foils of the upper and lower boundary layers.

The mode of operation of this multilayer sheet as a gasket material is as follows: The graphite foil or the graphite foils, which has or have an excellent stability at high temperatures, impart to the multilayer sheet a high compressibility, a high spring back capacity and an extremely low tendency to creep under pressure. The likewise temperature-stable metal foils do not creep under pressure and confer a high compressive strength on the multilayer sheet. They form an additional impermeable barrier for fluids. However, they cannot fit tightly to the unevennesses of surfaces against which they lie such as, for example, surfaces of flanges, through the use of which the pressure necessary to achieve a sealing action is to be transferred to the multilayer sheet or to a gasket produced from the sheet. The function of fitting is taken over by the foils made of an organic polymer which form the external boundaries of the multilayer sheet. Due to good flowability under pressure, they adapt very well to unevenness and damage present on such surfaces and thus provide excellent sealing. If they are used in a sufficiently low thickness, their tendency to creep, which per se is disadvantageous for gaskets, and their low spring back capacity, are of no consequence. That is because the adverse effects caused thereby are more than compensated for by the other components of the multilayer sheet, in particular by the graphite components.

The joinings between the different layers of the multilayer sheet can be produced by a suitable adhesive, which must have a long-term temperature stability of at least 150° C.

However, in accordance with another feature of the invention, joinings which are completely free of adhesives are preferred, between the graphite foils and the metal foils as well as between the metal foils and the polymer foils.

For the purpose of this invention, the term "graphite foils" means both graphite foils and graphite laminates obtained by known processes by the compression or calendering of expanded, so-called vermicular graphite. Expanded graphite is produced by the sudden decomposition of graphite salts, such as graphite hydrogen sulfate, at elevated temperatures. Vermicular graphite can be produced, for example, by a process disclosed in U.S. Pat. No. 4,091,083.

In accordance with a further feature of the invention, the graphite foils used for the production of multilayer sheets according to the invention and included in these multilayer sheets have a bulk density within the range of 0.1 g/cm$^3$ to 1.8 g/cm$^3$. They have a carbon content preferably within the range of 90 to 99.95 weight per cent. Their thickness is within the range of 0.1 mm to 4 mm.

In accordance with an added feature of the invention, the multilayer sheet is formed of a centrally disposed graphite foil having two flat surfaces each of which is joined to a metal foil, and the two outwardly-directed surfaces of the metal foils are covered with and joined to a polymer foil.

In accordance with another additional feature of the invention, the multilayer sheet is formed of a metal foil which is disposed in the center of the multilayer sheet and has a graphite foil joined to each of its two flat surfaces. The two free flat outwardly-directed surfaces of the graphite foils are each joined to a metal foil and the two free flat outwardly-directed surfaces of the metal foils are joined to a polymer foil.

In accordance with yet another feature of the invention one, or more than one, of the metal foils situated in the interior of the multilayer sheet, which are not joined to polymer foils, can be shaped in the form of a tanged metal sheet, and in this case its tines can be disposed on only one side or on both sides of the tanged metal sheet.

In accordance with yet a further feature of the invention, the metal foils can be joined to the polymer foils by any of the known processes. Preferably, however, joining will be done without the use of adhesives. In the case of the polymer foils which are suitable for this invention, solvent-free joining of the metal foils to the polymer foils by heat welding has proved to be best, and this can be successfully used even for polytetrafluoroethylene foils. This welding is advantageously carried out by additional application of pressure, for which both stamping presses and roll presses can be used. During the welding it is advantageous if the metal foils and the polymer foils have a temperature within the melting range of the polymer foils. In some cases it is advantageous that the metal foils have a temperature which is within the upper region of the melting range of the polymer foils and the polymer foils have a temperature below this range.

The joining of the surfaces of the graphite foils to those of the metal foils can be carried out through the use of adhesives or by pressing the surfaces of the tanged metal sheets inducing anchoring into the graphite foils without the use of adhesives. However, adhesives have the disadvantages described at the outset and tanged metal sheets are preferably used only in the center of the multilayer sheets. The preferred methods for joining the surfaces of the graphite foils to those of the metal foils do not use adhesives. In one method, the two foils are brought into contact at the surfaces by which they shall be joined and are compressed by applying pressure and temperatures within the range of 150° C. to 300° C. In the case of smaller expanses of the surfaces, this can be done in stamping presses. In the case of large widths, heatable twin-belt presses or roller frames are used. If one wishes to produce an extremely adherent joining between the metal foils and the graphite foils, one will use the process according to European Patent EP 0 616 884 B1, corresponding to U.S. Pat. No. 5,509,993, as another preferred method. According to that method, the surfaces to be joined together are coated with a substance acting per se as a separating agent by forming a layer as thin as possible and the joining is produced by pressure and the effect of higher temperatures.

In accordance with yet an added feature of the invention, the metal foils of the multilayer sheet may be formed of any metal which can be used for sealing purposes and can be produced as a foil. It is, however, preferable to use metal foils made of aluminum, aluminum alloys, copper and copper alloys and of a corrosion-resistant metal or of a corrosion-resistant metal alloy such as, for example, foils made of special steel.

In accordance with yet an additional feature of the invention, the metal foils have a thickness within the range of 0.005 to 1 mm. In special cases, the thickness may be outside of this range.

The polymer foils forming the boundary of the multilayer sheet at the two flat surfaces must have a long-term temperature stability of at least 150° C., preferably a long-term temperature stability of at least 200° C. and particularly preferably a long-term temperature stability of 250° C. Within the context of this invention, long-term temperature stability means that, at the specified temperature, the respective foil does not melt in air nor does it decompose noticeably. All foils which possess these features are suitable as components of the multilayer sheet according to the invention.

Nevertheless, in accordance with again another feature of the invention, the foils are preferably made of a material selected from the group including polyarylether ether ketone, polyaryl ether ketone, polyphenylene sulfide, polyaryl sulfone, polyether sulfone, polyimide, polyamide imide and fluorine-containing polymers. Particularly preferred materials are fluorine-containing polymers from the group including polytetrafluoroethylene, polytrifluorochloroethylene, tetrafluoroethylene-hexafluoropropylene copolymer, copolymers of tetrafluoroethylene with perfluoroalkyl vinyl ethers, copolymers of ethylene and tetrafluoroethylene and polyvinylidene fluoride, wherein of these films, those made of perfluorinated organic polymers are again preferred.

In accordance with again a further feature of the invention, the polymer foils included in the multilayer sheet have a thickness within the range of 0.005 to 1.0 mm, wherein thicknesses within the range of 0.03 to 0.2 mm are preferred.

In accordance with a concomitant feature of the invention, the multilayer sheets can be used as sealing coverings or as linings. They are, however, mainly used as material for producing gaskets, in particular flat gaskets.

Other features which are considered as characteristic for the invention are set forth in the appended claims.

Although the invention is illustrated and described herein as embodied in a metal-reinforced graphite multilayer sheet, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
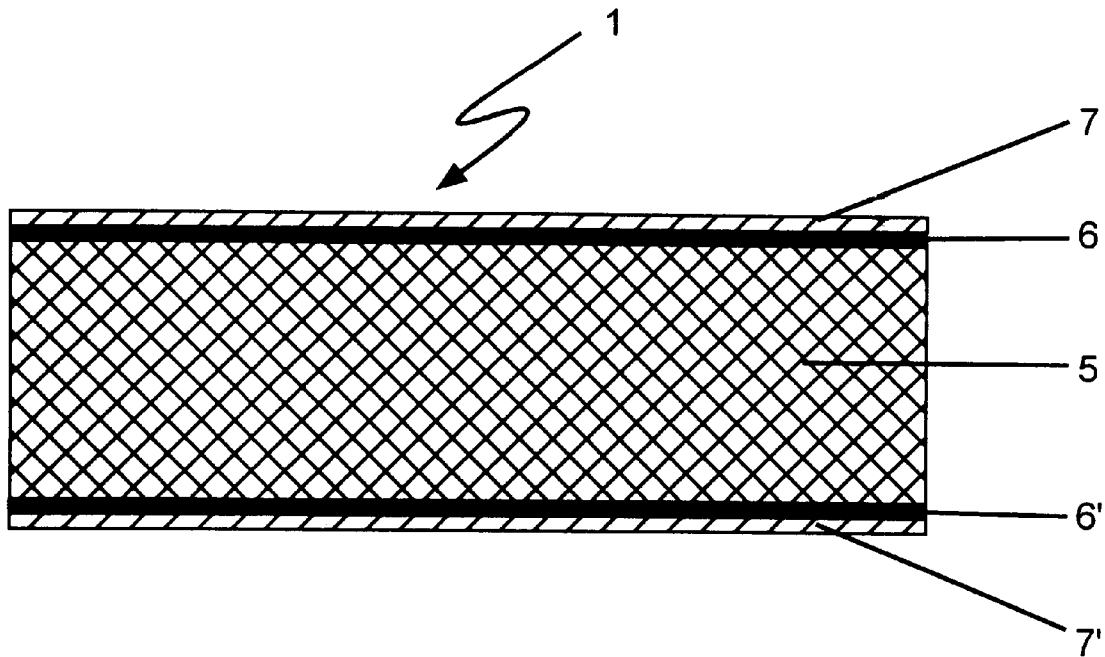
FIGS. 1, 2 and 3 are diagrammatic, transverse sections through different types of multilayer sheets according to the invention.

Referring now to the figures of the drawings in detail and first, particularly, to FIG. 1 thereof, there is seen a multilayer sheet 1 having a core 5 made of a graphite laminate. Two flat surfaces of this core 5 are each joined without a binder to a respective metal foil 6, 6' made of copper. Flat surfaces of the metal foils 6, 6' which are directed toward the outside are each completely covered by and joined without a binder to a respective polymer foil 7, 7' made of polyetherketone.

Figure 2:
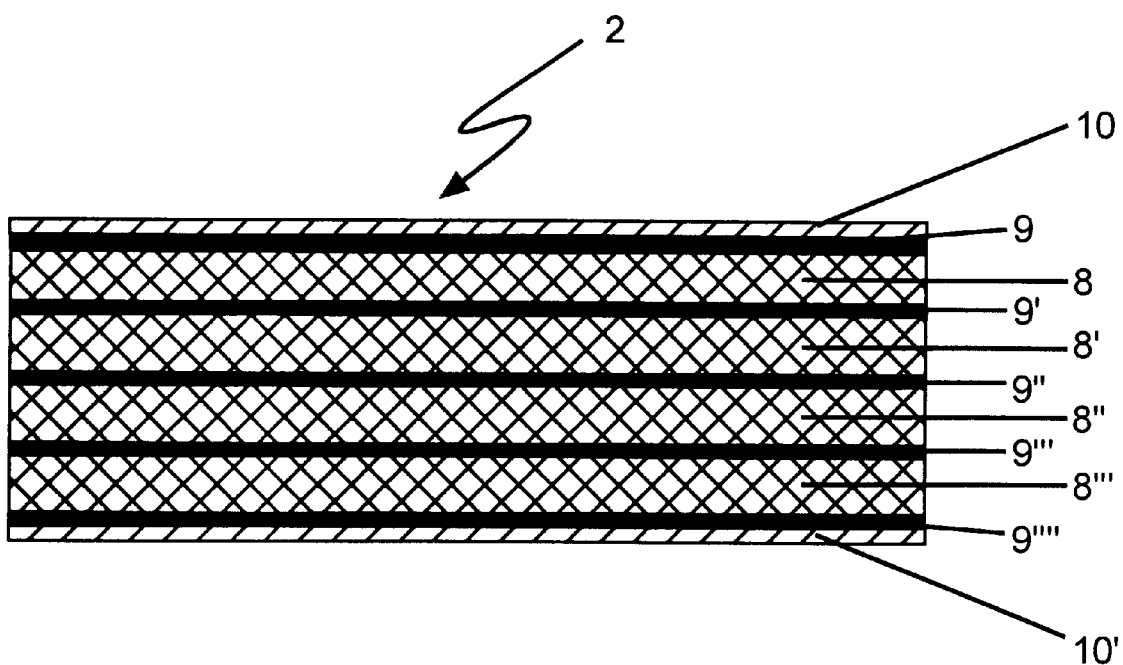

FIG. 2 shows a multilayer sheet 2, including in total four layers of graphite foil 8, 8', 8", 8"', having flat surfaces which are joined without the use of an adhesive to metal foils 9, 9', 9", 9"', 9"" made of aluminum. The joining of the metal foils 9, 9', 9", 9"', 9"" with the graphite foils 8, 8', 8", 8"' was carried out by a process according to European Patent EP 0 616 884 B1, corresponding to U.S. Pat. No. 5,509,993. Flat surfaces of the two outer metal sheets 9, 9"" which are directed to the outside are each joined without an adhesive to a respective polymer foil 10, 10' made of tetrafluoroethylene-perfluoropropylene copolymer.

Figure 3:
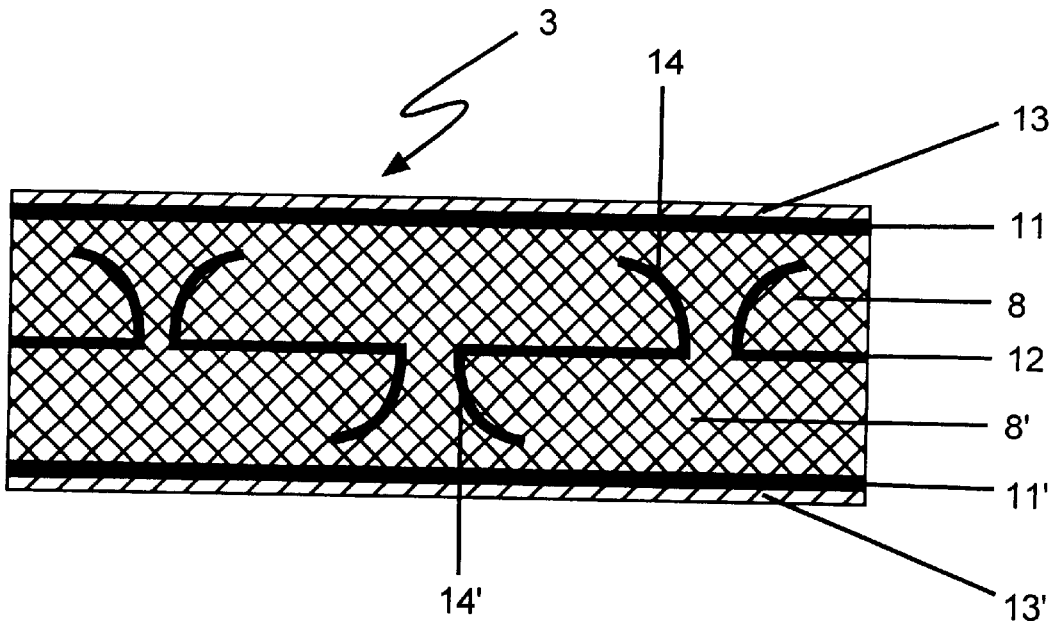

FIG. 3 shows a multilayer sheet 3. A tanged metal sheet 12 made of special steel is disposed inside the multilayer sheet 3. The tanged metal sheet 12 has tines 14, 14' on both sides with which the tanged metal sheet engages at each of its two surfaces in a respective graphite foil 8, 8'. Two flat surfaces of the graphite foils 8, 8', which are not joined to the tanged metal sheet 12, are each joined without the use of an adhesive to a respective metal foil 11, 11' made of special steel. Flat surfaces of both of these metal foils 11, 11'0 which are directed toward the outside are each joined to a respective polymer foil 13, 13' made of polytetrafluoroethylene. The joining between the polytetrafluoroethylene foils 13, 13' and the special steel foils 11, 11' was produced by welding the foils to be combined under pressure in a twin-belt press at a temperature of approximately 380° C.

Figure 4:
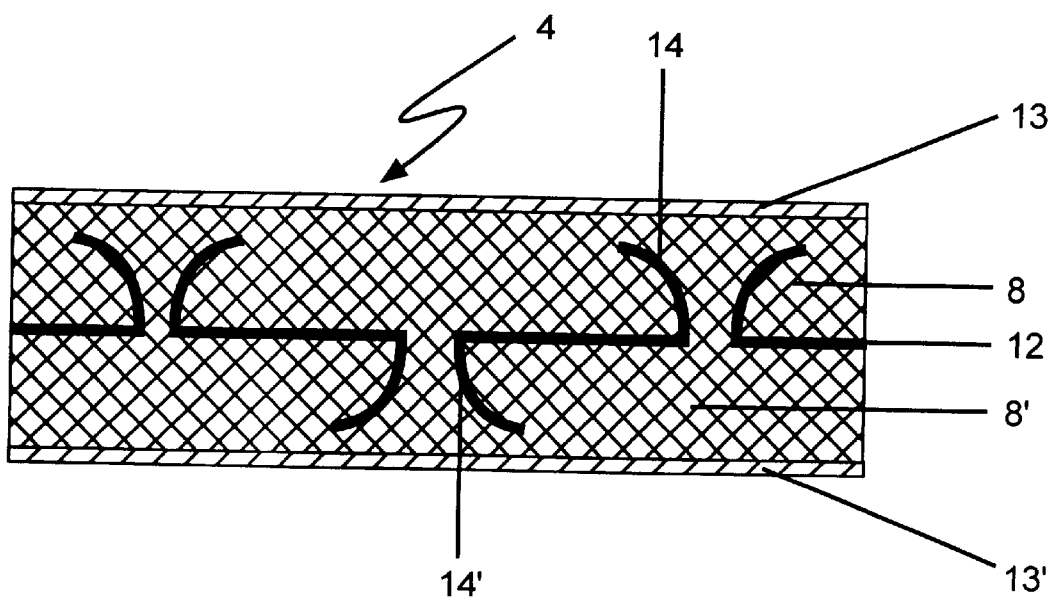
FIG. 4 is a transverse section through a multilayer sheet which is not constructed according to the invention.

FIG. 4 shows a multilayer sheet 4, which has a considerably lower compressive strength than the multilayer sheets 1, 2 and 3 according to the invention that are shown as examples in FIGS. 1, 2 and 3. The structure of the multilayer sheet 4 corresponds to that of the multilayer sheet 3 of FIG. 3, with the difference that in it the metal foils 11, 11' between the polymer foils 13, 13' and the graphite foils 8, 8' are absent. As will be shown below, this multilayer sheet 4 has a considerably lower compressive strength than the multilayer sheets according to the invention.

EXAMPLE 1

Production of a multilayer sheet having the structure shown in FIG. 3. In order to produce the core of the multilayer sheet, two webs of graphite foil having a thickness of 1.05 mm and a bulk density of 0.9 g/cm$^3$, and a tanged metal sheet provided with tines on both sides and made of special steel, material No. 1.4401, which had a sheet thickness of 0.1 mm, were provided. The webs of graphite foil and the tanged metal sheet were rolled together through the use of a generally known process in a roller frame, in such a way as to produce a graphite foil body reinforced with a tanged metal sheet having a graphite foil on both sides with a bulk density of 1.0 g/cm$^3$. The two rolls of the roller frame had been adjusted to a gap width of 1.9 mm. Independently of the joining of the tanged metal sheet to the two graphite foils described above, a 50 μm thick foil made of special steel, material no. 1.4401, having a surface roughness $R_z$ of approximately 10 μm, was joined without an adhesive, to a likewise 50 μm thick polymer foil made of polytetrafluoroethylene (TFM 1700, manufactured by Dyneon, Burgkirchen, Germany). The joining was carried out in a hot press having press plates with high plane-parallelism which had hard-chrome plated, polished surfaces, that had been coated with a release agent. Both press plates were at a temperature of approximately 370° C. The metal foil covered with the polymer foil was placed in the press and compressed for 5 minutes under a pressing power of 2 MPa. The metal foil/polymer foil composite was removed from the press and cooled to room temperature, for the purpose of joining to the graphite foil body reinforced with the tanged metal sheet. After the removal and cooling, the uncovered metal surface of the metal foil/polymer foil composite was coated with a thin layer of a mixture of a siloxane emulsion and a fatty alcohol according to European Patent EP 0 616 884 B1, corresponding to U.S. Pat. No. 5,509,993. After the emulsion/fatty alcohol mixture had been dried, in order to produce the multilayered body, a stack having the following layer structure was assembled: 1. composite sheet made of polymer foil and metal foil, 2. graphite foil body reinforced with a tanged metal sheet, 3. composite sheet made of polymer foil and metal foil. In the stack, the polymer foils of the polymer foil/metal foil composite are always directed to the outside and the metal surfaces covered with the siloxane emulsion/fatty alcohol mixture are always directed towards the graphite side of the graphite foil body reinforced with the tanged metal sheet. The stack was then transferred into a heated stamping press and compressed for approximately 1 hour at a surface pressure of 7 MPa and at a temperature of 200° C. Measurements were carried out on parts cut out of this multilayer sheet, the results of which are reported below.

EXAMPLE 2

This Example describes the production of a multilayer sheet having a structure which corresponds to that of the multilayer sheet 2 in FIG. 2. First of all, as already described in Example 1, two composites were produced, each formed of a polymer foil and a metal foil. Thereafter, the three metal foils (thickness 50 μm, material No. 1.4401), which were to be joined on both sides to graphite foils corresponding to the procedure of Example 1. were covered on both of their flat surfaces with a coating of a siloxane/fatty alcohol mixture. A stack being formed of the following sequence of layers was then produced: 1. composite sheet made of polymer foil and metal foil, 2. graphite foil (thickness 0.51 mm, bulk density 1.0 g/cm$^3$), 3. metal foil, 4. graphite foil as in 2., 5. metal foil, 6. graphite foil as in 2., 7. metal foil, 8. graphite foil as in 2., 9. composite sheet made of polymer foil and metal foil. This stack, as described in Example 1, was transferred to a heated stamping press and compressed there to form a multilayer sheet.

EXAMPLE 3

This multilayer sheet 4 corresponding to FIG. 4 and formed of a core made of two graphite foils reinforced with a tanged metal sheet and a coating made of polymer foils on both sides, was produced for comparative purposes. To that end, first of all a core formed of two graphite foils and a tanged metal sheet was produced by the process described in Example 1. The body thus obtained was then thoroughly dried in a forced-air oven at 105° C. The graphite foil body reinforced with a tanged metal sheet was then wrapped in a polytetrafluoroethylene foil of the type which was also used in the previous examples. The stack including the polymer foil and the core reinforced with a tanged metal sheet was transferred into a die block, previously heated to 375° C., of a hot press and there compressed at a pressing power of 2 MPa for about 5 minutes. The graphite foils became welded to the polymer foils under those conditions.

The following measurements were made on test specimens from multilayer sheets which had been produced according to Examples 1, 2 and 3:

determination of the compressive strength in dependence on the temperature in accordance with DIN 28090-1;

determination of the compressibility performance and of the spring back performance at room temperature, at 150° C. and at 300° C. in accordance with DIN 28090-2.

In addition, the specific leakage rate in dependence on the gasket stress was determined for a flat gasket produced from a multilayer sheet according to Example 1, having an inner eyelet made of special steel (material No. 1.4571). This specific leakage rate was compared with that for a corresponding flat gasket which had been produced from a multilayer sheet being formed solely of two graphite foils between which a tanged metal was disposed. Unlike the multilayer sheet according to the invention, the multilayer sheet used for comparison lacked the coating on both sides by the metal foil joined to the polymer foil.

The measured values of the compressive strength test are shown in Table 1:

TABLE 1

Critical surface pressure (MPa) at the moment of failure of the multilayer sheet

| Multilayer Sheet according to | Temperature | | |
|---|---|---|---|
| | 20° C. | 150° C. | 300° C. |
| Example 1 | 148 | 130 | 118 |
| Example 2 | 138 | 120 | 112 |
| Example 3 (for comparison) | 119 | 88 | 71 |

It can be seen that at all temperatures the multilayer sheets according to the invention have a considerably higher compressive strength than that of the comparison multilayer sheet. The multilayer sheets according to the invention perform relatively better upon a change to more elevated temperatures.

Table 2 shows values characterizing the compression performance and the spring back performance measured at room temperature and at 150° C.:

TABLE 2

Values of compression modulus $\epsilon_{KSW}$ and percentage creep relaxation $\epsilon_{KRW}$ at room temperature 20° C. and values of compression modulus $\epsilon_{WSW}$ and percentage creep relaxation $\epsilon_{WRW}$ at the elevated temperature of 150° C., with measurements in accordance with DIN 28090-2

| Multilayer Sheet according to | 20° C. | | 150° C. | |
|---|---|---|---|---|
| | $\epsilon_{KSW}$ (%) | $\epsilon_{KRW}$ (%) | $\epsilon_{WSW}$ (%) | $\epsilon_{WRW}$ (%) |
| Example 1 | 18.8 | 4.5 | 1.5 | 4.1 |
| Example 2 | 20.1 | 4.7 | 0.8 | 4.4 |
| Example 3 (for comparison) | 34.5 | 3.9 | 1.3 | 3.6 |

Values of $\epsilon_{KSW}$ and $\epsilon_{WSW}$ are measured at a surface pressure of 20 MPa in accordance with DIN 28091-3.

The measured values for the compression performance and the spring back performance at room temperature and at 300° C. can be seen in Table 3:

TABLE 3

Values of compression modulus $\epsilon_{KSW}$ and percentage creep relaxation $\epsilon_{KRW}$ at room temperature 20° C. and values of compression modulus $\epsilon_{WSW}$ and percentage creep relaxation $\epsilon_{WRW}$ at the elevated temperature of 300° C., with measurements in accordance with DIN 28090-2

| Multilayer Sheet according to | 20° C. | | 300° C. | |
|---|---|---|---|---|
| | $\epsilon_{KSW}$ (%) | $\epsilon_{KRW}$ (%) | $\epsilon_{WSW}$ (%) | $\epsilon_{WRW}$ (%) |
| Example 1 | 26.1 | 4.0 | 2.8 | 4.2 |
| Example 2 | 23.8 | 4.3 | 3.7 | 4.5 |
| Example 3 (for comparison) | 39.1 | 3.5 | 2.2 | 3.8 |

Values of $\epsilon_{KSW}$ are measured at a surface pressure of 35 MPa in accordance with DIN 28091-4. Values of $\epsilon_{WSW}$ are measured at a surface pressure of 50 MPa in accordance with DIN 28091-4.

Explanatory notes to Tables 2 and 3:

Values of compression modulus at room temperature $\epsilon_{KSW}$ and elevated temperature $\epsilon_{WSW}$ are values which indicate the compressibility of the multilayer sheets at room temperature and at elevated temperature, respectively.

Values of percentage creep relaxation at room temperature $\epsilon_{KRW}$ and elevated temperature $\epsilon_{WRW}$ are values which indicate the spring back capacity of the multilayer sheets after prior compression at room temperature and at elevated temperature, respectively.

It follows from Tables 2 and 3 that the multilayer sheets according to the invention are not as compressible as the multilayer sheet which does not have upper covering layers made of metal foils. On the contrary, the spring back capacity of the multilayer sheets according to the invention in all temperature ranges is at least just as good as that of the comparison multilayer sheet. Regarding the use of the multilayer sheets in gaskets or seals, this means that where there is stressing of flanges during the use of the multilayer sheets according to the invention in the gaskets or seals, smaller distances are inevitably covered than in the case of prior art gaskets or seals. However, due to the high spring back capacity, the sealing effect of the gaskets according to the invention is better. This is valid for a temperature range extending from the lowest temperatures up to 300° C.

Figure 5:
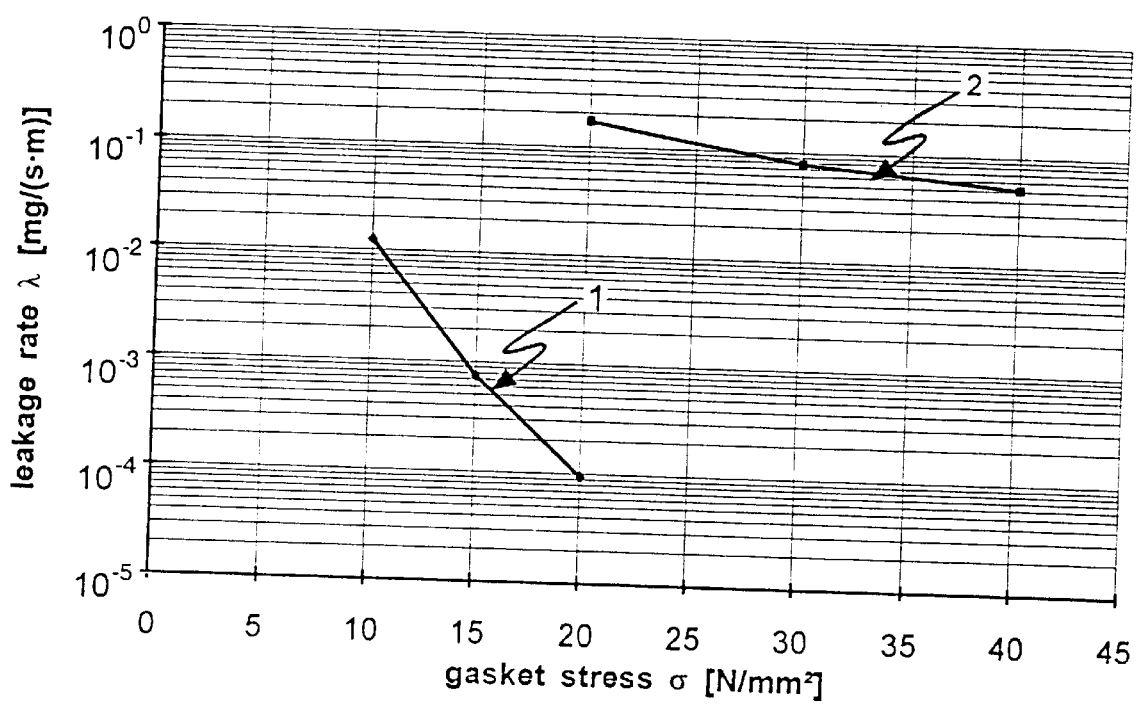
FIG. 5 is a diagram comparing sealing effects characterized by specific leakage rates for two gaskets.

FIG. 5 is a diagram which illustrates a sealing effect characterized by a specific leakage rate for a flat gasket 1 having a thickness of 2 mm and an inner eyelet made of a sheet of special steel, material no. 1.4571, with a thickness of 0.15 mm, which has been produced from a multilayer sheet as described in Example 1. The sealing effect for the flat gasket 1 is compared by way of example with a corresponding gasket 2 (inner eyelet made of a sheet of special steel having a thickness of 0.15 mm, material No. 1.4571, with a total thickness of the gasket of 2 mm) which had been produced from a multilayer sheet formed solely of two graphite foils between which a tanged metal sheet is disposed. Unlike the multilayer sheet according to the invention, the multilayer sheet used for the comparison lacked the coating on both sides by the metal foil joined to the polymer foil. The test was carried out with an internal pressure of 40 bar nitrogen gas, in accordance with DIN 28090-1. The great superiority of the multilayer sheets according to the invention as gasket or sealing materials can be clearly seen from the diagram, without further explanation. Even at comparatively low gasket stresses, it is therewith possible to achieve low leakage rates such as could never be achieved using the comparison multilayer sheets. Through the use of multilayer sheets according to the invention it is possible to provide gaskets which surpass, by several orders of magnitude, the impermeability requirements of 0.01 mg/(s.m) provided in the Technische Anleitung Luft [Technical Instructions for Pollution abatement of Air/German administration regulations]. Thus, for example, leakage values of only 0.001 mg/(s.m) can be achieved.

We claim:

1. A multilayer sheet having high compressive strength, high heat resistance and low permeability relative to fluids, comprising:

alternating parallel layers of at least one graphite foil and metal foils disposed one upon the other and joined to one another;

said layers of metal foils including an upper boundary layer and a lower boundary layer each having a flat outwardly-directed surface; and two gas-tight foils made of an organic polymer having a long-term temperature stability of at least 150° C., said gas-tight foils each completely covering and joined to a respective one of said flat outwardly-directed surfaces of said metal foils of said upper and lower boundary layers.

2. The multilayer sheet according to claim 1, wherein said at least one graphite foil is joined to said metal foils and said metal foils are joined to said polymer foils, free of adhesives.

3. The multilayer sheet according to claim 1, wherein said at least one graphite foil is a plurality of graphite foils, and at least one of said metal foils is an interior tanged metal sheet having two surfaces each joined to a respective one of said graphite foils.

4. The multilayer sheet according to claim 2, wherein said at least one graphite foil is a plurality of graphite foils, and at least one of said metal foils is an interior tanged metal sheet having two surfaces each joined to a respective one of said graphite foils.

5. The multilayer sheet according to claim 1, wherein said at least one graphite foil layer is two graphite foil layers, said metal foils include a centrally disposed metal foil having flat surfaces each joined to a respective one of said graphite foils and two other metal foils, said two graphite foils each having a flat outwardly-directed surface joined to a respective one of said two other metal foils and said two other metal foils each having a flat outwardly-directed surface completely joined to a respective one of said polymer foils.

6. The multilayer sheet according to claim 3, wherein said plurality of graphite foil layers are two graphite foil layers, said metal foils include said tanged metal sheet centrally disposed and having two surfaces each joined to a respective one of said graphite foils and two other metal foils, said two graphite foils each having a flat outwardly-directed surface joined to a respective one of said two other metal foils and said two other metal foils each having a flat outwardly-directed surface completely joined to a respective one of said polymer foils.

7. The multilayer sheet according to claim 1, wherein said at least one graphite foil layer is a centrally disposed graphite foil layer having flat surfaces, said metal foils are each joined to a respective one of said flat surfaces, and said outwardly-directed surfaces of said metal foils are each completely covered with a respective one of said polymer foils.

8. The multilayer sheet according to claim 1, wherein said polymer foils are heat-welded with said metal foils.

9. The multilayer sheet according to claim 2, wherein said polymer foils are heat-welded with said metal foils.

10. The multilayer sheet according to claim 1, wherein said polymer foils are welded with said metal foils by heat and an effect of pressure.

11. The multilayer sheet according to claim 2, wherein said polymer foils are welded with said metal foils by heat and an effect of pressure.

12. The multilayer sheet according to claim 4, wherein said polymer foils are welded with said metal foils by heat and an effect of pressure.

13. The multilayer sheet according to claim 1, wherein said graphite foils are pressed onto said metal foils by applying pressure and elevated temperature.

14. The multilayer sheet according to claim 2, wherein said graphite foils are pressed onto said metal foils by applying pressure and elevated temperature.

15. The multilayer sheet according to claim 1, wherein said at least one graphite foil is joined to said metal foils by applying a contact-surface active agent selected from the group consisting of organosilicon compounds, perfluorinated compounds and metal soaps in a thin layer to at least one of said graphite and metal foils and then bringing said graphite and metal foils into contact with pressure and heat.

16. The multilayer sheet according to claim 2, wherein said at least one graphite foil is joined to said metal foils by applying a contact-surface active agent selected from the group consisting of organosilicon compounds, perfluorinated compounds and metal soaps in a thin layer to at least one of said graphite and metal foils and then bringing said graphite and metal foils into contact with pressure and heat.

17. The multilayer sheet according to claim 4, wherein said graphite foils are joined to said metal foils by applying a contact-surface active agent selected from the group consisting of organosilicon compounds, perfluorinated compounds and metal soaps in a thin layer to at least one of said graphite and metal foils and then bringing said graphite and metal foils into contact with pressure and heat.

18. The multilayer sheet according to claim 8, wherein said at least one graphite foil is joined to said metal foils by applying a contact-surface active agent selected from the group consisting of organosilicon compounds, perfluorinated compounds and metal soaps in a thin layer to at least one of said graphite and metal foils and then bringing said graphite and metal foils into contact with pressure and heat.

19. The multilayer sheet according to claim 10, wherein said at least one graphite foil is joined to said metal foils by applying a contact-surface active agent selected from the group consisting of organosilicon compounds, perfluorinated compounds and metal soaps in a thin layer to at least one of said graphite and metal foils and then bringing said graphite and metal foils into contact with pressure and heat.

20. The multilayer sheet according claim 3, wherein:
said graphite foils are joined to said metal foils by applying a contact-surface active agent selected from the group consisting of organosilicon compounds, perfluorinated compounds and metal soaps in a thin layer to at least one of said graphite and metal foils and then bringing said graphite and metal foils into contact with pressure and heat; and
said polymer foils are welded to said metal foils by heat and an effect of pressure.

21. The multilayer sheet according to claim 1, wherein said metal foils are formed of a material selected from the group consisting of corrosion-resistant metals, corrosion-resistant metal alloys, aluminum, aluminum alloys, copper and copper alloys.

22. The multilayer sheet according to claim 1, wherein said metal foils have a thickness within a range of 0.005 mm to 1 mm.

23. The multilayer sheet according to claim 1, wherein said at least one graphite foil has a bulk density within a range of 0.1 g/cm$^3$ to 1.8 g/cm$^3$ and a carbon content of from 90 to 99.95 per cent by weight.

24. The multilayer sheet according to claim 1, wherein said at least one graphite foil has a thickness of from 0.1 mm to 4.0 mm.

25. The multilayer sheet according to claim 23, wherein said at least one graphite foil has a thickness of from 0.1 mm to 4.0 mm.

26. The multilayer sheet according to claim 1, wherein said polymer foils are made of a material selected from the group consisting of polyarylether ether ketone, polyaryl ether ketone, polyphenylene sulfide, polyaryl sulfone, polyether sulfone, polyimide, polyamide imide and fluorine-containing polymers.

27. The multilayer sheet according to claim 26, wherein said polymer foils are made of a material selected from the group consisting of polytetrafluoroethylene, polytrifluorochloroethylene, tetrafluoroethylenehexafluoropropylene copolymer, copolymers of tetrafluoroethylene with perfluoroalkyl vinyl ether, polyvinylidene fluoride and copolymers of ethylene and tetrafluoroethylene.

28. The multilayer sheet according to claim 27, wherein said polymer foils are made of a perfluorinated organic polymer.

29. The multilayer sheet according to claim 1, wherein said polymer foils have a thickness within a range of 0.005 mm to 1.0 mm.

30. The multilayer sheet according to claim 22, wherein said polymer foils have a thickness within a range of 0.005 mm to 1.0 mm; and said at least one graphite foil has a thickness of from 0.1 mm to 4.0 mm.

31. The multilayer sheet according to claim 2, wherein said polymer foils have a thickness within a range of 0.005 mm to 1.0 mm;

said at least one graphite foil has a thickness of from 0.1 mm to 4.0 mm; and said metal foils have a thickness within a range of 0.005 mm to 1 mm.

32. The multilayer sheet according to claim 19, wherein said polymer foils have a thickness within a range of 0.005 mm to 1.0 mm;

said at least one graphite foil has a thickness of from 0.1 mm to 4.0 mm; and said metal foils have a thickness within a range of 0.005 mm to 1 mm.

33. The multilayer sheet according to claim 26, wherein said polymer foils have a thickness within a range of 0.005 mm to 1.0 mm.

34. The multilayer sheet according to claim 2, wherein said polymer foils have a thickness within a range of 0.005 mm to 1.0 mm; and said polymer foils are made of a material selected from the group consisting of polyarylether ether ketone, polyaryl ether ketone, polyphenylene sulfide, polyaryl sulfone, polyether sulfone, polyimide, polyamide imide and fluorine-containing polymers.

35. The multilayer sheet according to claim 11, wherein said polymer foils have a thickness within a range of 0.005 mm to 1.0 mm; and said polymer foils are made of a material selected from the group consisting of polyarylether ether ketone, polyaryl ether ketone, polyphenylene sulfide, polyaryl sulfone, polyether sulfone, polyimide, polyamide imide and fluorine-containing polymers.

36. The multilayer sheet according to claim 4, wherein:

said polymer foils have a thickness within a range of 0.005 mm to 1.0 mm;

said metal foils include a centrally disposed metal foil having two surfaces each joined to a respective one of said graphite foils and two other metal foils, said two graphite foils each having a flat outwardly-directed surface joined to a respective one of said two other metal foils and said two other metal foils each having a flat outwardly-directed surface completely joined to a respective one of said polymer foils; and said polymer foils are made of a material selected from the group consisting of polyarylether ether ketone, polyaryl ether ketone, polyphenylene sulfide, polyaryl sulfone, polyether sulfone, polyimide, polyamide imide and fluorine-containing polymers.

37. The multilayer sheet according to claim 16, wherein said polymer foils have a thickness within a range of 0.005 mm to 1.0 mm; and said polymer foils are made of a material selected from the group consisting of polyarylether ether ketone, polyaryl ether ketone, polyphenylene sulfide, polyaryl sulfone, polyether sulfone, polyimide, polyamide imide and fluorine-containing polymers.

38. The multilayer sheet according to claim 19, wherein said polymer foils have a thickness within a range of 0.005 mm to 1.0 mm; and said polymer foils are made of a material selected from the group consisting of polyarylether ether ketone, polyaryl ether ketone, polyphenylene sulfide, polyaryl sulfone, polyether sulfone, polyimide, polyamide imide and fluorine-containing polymers.

39. The multilayer sheet according to claim 6, wherein:

said polymer foils have a thickness within a range of 0.005 mm to 1.0 mm;

said polymer foils are welded with said metal foils by heat and an effect of pressure;

said graphite foils are joined to said metal foils by applying a contact-surface active agent selected from the group consisting of organosilicon compounds, perfluorinated compounds and metal soaps in a thin layer to at least one of said graphite and metal foils and then bringing said graphite and metal foils into contact with pressure and heat; and said polymer foils are made of a material selected from the group consisting of polyarylether ether ketone, polyaryl ether ketone, polyphenylene sulfide, polyaryl sulfone, polyether sulfone, polyimide, polyamide imide and fluorine-containing polymers.

40. The multilayer sheet according to claim 19, wherein:

said polymer foils have a thickness within a range of 0.005 mm to 1.0 mm;

said metal foils are made of a material selected from the group consisting of corrosion-resistant metals, corrosion-resistant metal alloys, aluminum, aluminum alloys, copper and copper alloys;

said metal foils have a thickness within a range of 0.005 mm to 1 mm;

said at least one graphite foil has a bulk density within a range of 0.1 g/cm$^3$ to 1.8 g/cm$^3$ and a carbon content of from 90 to 99.95 per cent by weight;

said graphite foils have a thickness of from 0.1 mm to 4.0 mm; and said polymer foils are made of a material selected from the group consisting of polyarylether ether ketone, polyaryl ether ketone, polyphenylene sulfide, polyaryl sulfone, polyether sulfone, polyimide, polyamide imide and fluorine-containing polymers.

41. The multilayer sheet according to claim 27, wherein said polymer foils have a thickness within a range of 0.005 mm to 1.0 mm.

42. The multilayer sheet according to claim 28, wherein said polymer foils have a thickness within a range of 0.005 mm to 1.0 mm.

43. The multilayer sheet according to claim 2, wherein said polymer foils have a thickness within a range of 0.005 mm to 1.0 mm; and said polymer foils are made of a perfluorinated organic polymer.

44. The multilayer sheet according to claim 11, wherein said polymer foils have a thickness within a range of 0.005 mm to 1.0 mm; and said polymer foils are made of a perfluorinated organic polymer.

45. The multilayer sheet according to claim 4, wherein:

said polymer foils have a thickness within a range of 0.005 mm to 1.0 mm;

said metal foils include a centrally disposed metal foil having two surfaces each joined to a respective one of said graphite foils and two other metal foils, said two graphite foils each having a flat outwardly-directed surface joined to a respective one of said two other metal foils and said two other metal foils each having a flat outwardly-directed surface completely joined to a respective one of said polymer foils; and said polymer foils are made of a perfluorinated organic polymer.

46. The multilayer sheet according to claim 16, wherein said polymer foils have a thickness within a range of 0.005 mm to 1.0 mm; and said polymer foils are made of a perfluorinated organic polymer.

47. The multilayer sheet according to claim 19, wherein said polymer foils have a thickness within a range of 0.005 mm to 1.0 mm; and said polymer foils are made of a perfluorinated organic polymer.

48. The multilayer sheet according to claim 6, wherein:

said polymer foils have a thickness within a range of 0.005 mm to 1.0 mm;

said polymer foils are welded with said metal foils by heat and an effect of pressure;

said graphite foils are joined to said metal foils by applying a contact-surface active agent selected from the group consisting of organosilicon compounds, perfluorinated compounds and metal soaps in a thin layer to at least one of said graphite and metal foils and then bringing said graphite and metal foils into contact with pressure and heat; and said polymer foils are made of a perfluorinated organic polymer.

49. The multilayer sheet according to claim 22, wherein:

said polymer foils have a thickness within a range of 0.005 mm to 1.0 mm;

said at least one graphite foil has a thickness of from 0.1 mm to 4.0 mm; and said polymer foils are made of a perfluorinated organic polymer.

50. The multilayer sheet according to claim 1, wherein said foils together form a material for producing gaskets.

51. The multilayer sheet according to claim 2, wherein said foils together form a material for producing gaskets.

52. The multilayer sheet according to claim 3, wherein said foils together form a material for producing gaskets.

53. The multilayer sheet according to claim 4, wherein said foils together form a material for producing gaskets.

54. The multilayer sheet according to claim 5, wherein said foils together form a material for producing gaskets.

55. The multilayer sheet according to claim 6, wherein said foils together form a material for producing gaskets.

56. The multilayer sheet according to claim 9, wherein said foils together form a material for producing gaskets.

57. The multilayer sheet according to claim 11, wherein said foils together form a material for producing gaskets.

58. The multilayer sheet according to claim 12, wherein said foils together form a material for producing gaskets.

59. The multilayer sheet according to claim 14, wherein said foils together form a material for producing gaskets.

60. The multilayer sheet according to claim 16, wherein said foils together form a material for producing gaskets.

61. The multilayer sheet according to claim 17, wherein said foils together form a material for producing gaskets.

62. The multilayer sheet according to claim 18, wherein said foils together form a material for producing gaskets.

63. The multilayer sheet according to claim 19, wherein said foils together form a material for producing gaskets.

64. The multilayer sheet according to claim 20, wherein said foils together form a material for producing gaskets.

65. The multilayer sheet according to claim 33, wherein said foils together form a material for producing gaskets.

66. The multilayer sheet according to claim 42, wherein said foils together form a material for producing gaskets.

67. The multilayer sheet according to claim 49, wherein said foils together form a material for producing gaskets.

* * * * *